(No Model.)
N. NEWSOM.
STACKER FOR HAY AND STRAW.
No. 253,940. Patented Feb. 21, 1882.
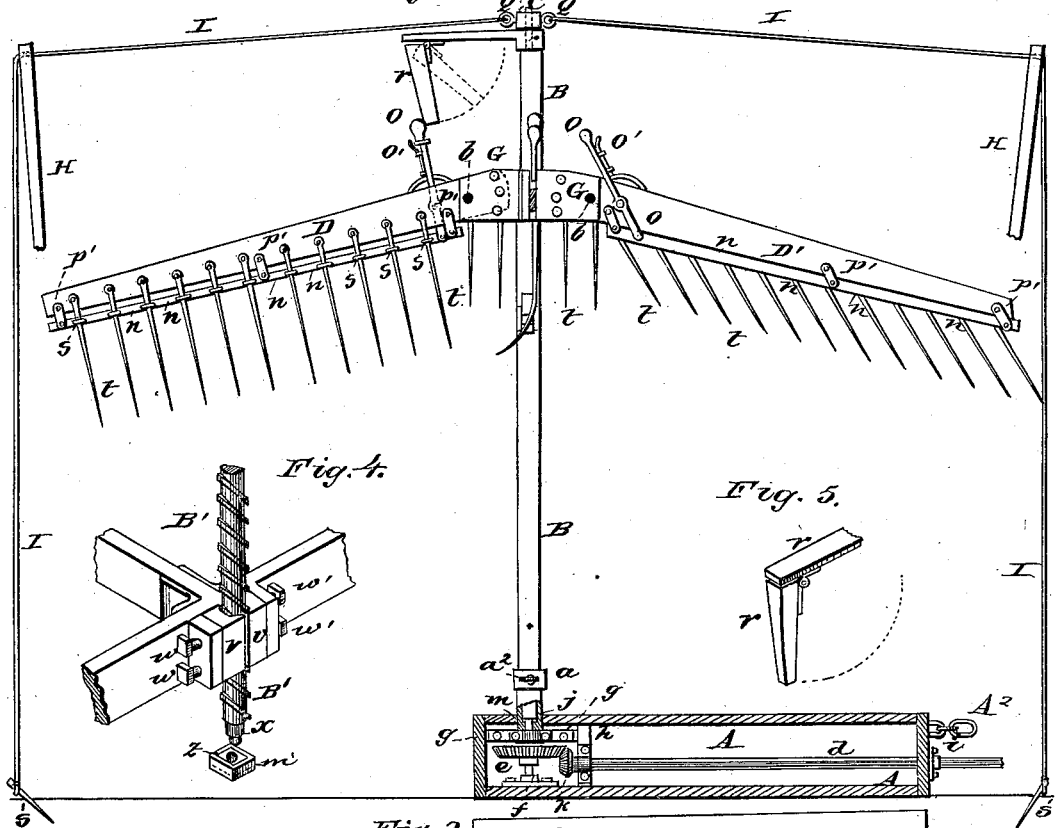
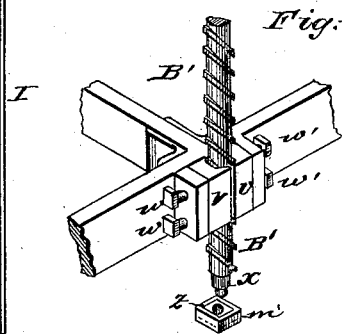
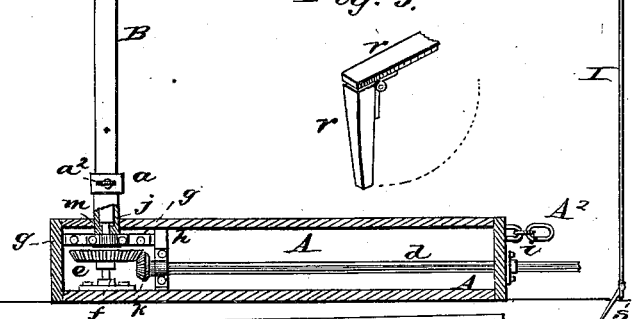
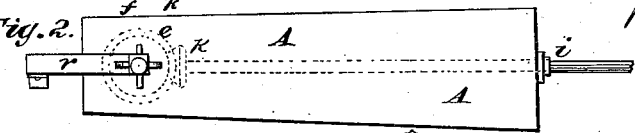
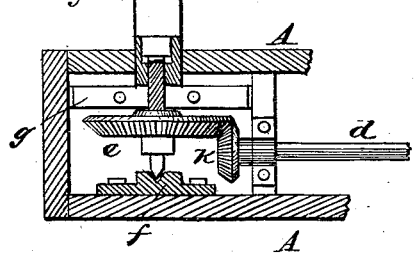
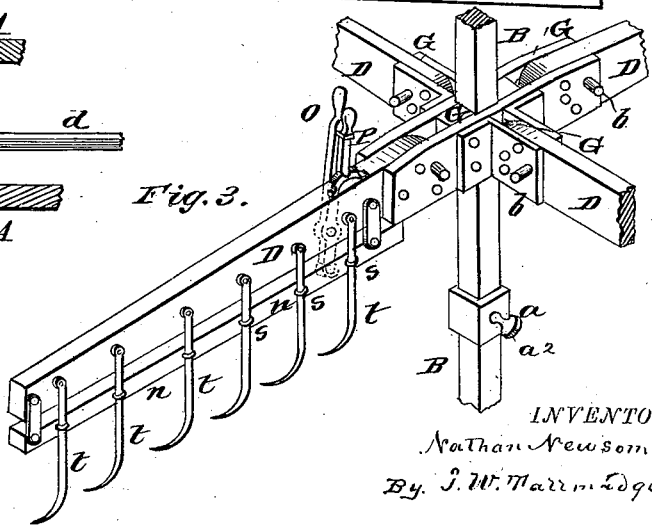
WITNESSES
INVENTOR
Nathan Newsom
By J. W. Tarr...dge
Attorneys

UNITED STATES PATENT OFFICE.

NATHAN NEWSOM, OF COLUMBUS, INDIANA.

STACKER FOR HAY AND STRAW.

SPECIFICATION forming part of Letters Patent No. 253,940, dated February 21, 1882.

Application filed August 29, 1881. (No model.)

*To all whom it may concern:*

Be it known that I, NATHAN NEWSOM, of Columbus, in the county of Bartholomew and State of Indiana, have invented certain new and useful Improvements in Stackers for Hay and Straw; and I do hereby declare that the following is a full, clear, and exact description of the invention, which will enable others skilled in the art to which it appertains to make and use the same, reference being had to the accompanying drawings, which form a part of this specification.

My invention relates to hay or straw stackers; and it consists in details of construction that will be hereinafter more fully set forth in the specification and claims, and pointed out in the drawings, in which—

Figure 1 is a side elevation, partly in section, of my devic; Fig. 2, a plan view of gear-box and stacking-shaft; Fig. 3, a perspective view of rake-head, rake-arm, and stacking-shaft. Fig. 4 is a modification of stacking-shaft and rake-head. Fig. 5 is a detail view of the device for tripping the teeth-handle, and Fig. 6 is an enlarged section of gear-box and crown-wheel pinion which actuates the stacking-shaft.

Referring more particularly to the drawings, A represents a gear-box with open ends, and intended to lie on the ground and extend from the outer periphery to and a little beyond the center of the stack. On the bottom of this box, and at the center of the stack, is a toe-rest, $f$, and just above it a horizontal gearing, $g$. Outside of this is a vertical bearing, $h$, and at the outer end of the gear-box is another vertical bearing, $i$. In these bearings $h$ $i$ works the shaft $d$, on the inner end of which is attached a small beveled pinion, $k$, meshing with a larger beveled pinion, $e$, secured to a short vertical shaft, $j$, seated in the toe-rest $f$. The size of the pinions depends on the speed required.

On the top of shaft $j$ is fixed a socket, $m$, extending through and intended to be flush with the top of the gear-box. In this socket is fitted the foot of a stacking-shaft, B, which moves with the socket. A rake-head, G, fits loosely upon the shaft B, and is adapted to be placed on the top of the shaft and move down until it rests on a collar or stop, $a$, on shaft B, said collar or stop being located at a point sufficiently above the gear-box to cause the teeth in the rakes to clear the top of the gear-box when the rakes are in a horizontal position, said collar being provided with a suitable set-screw or holding device, $a^2$, so that it may be held securely in place at any desired point on the shaft. The rake-head G is so constructed, either in parts bolted together or cast in one solid piece, as to give four vertical jaw-openings equidistant from each other, so as to receive the rake-arms D, secured therein by a bolt or bolts, $b$, near the outer end of the jaws and inner end of the rake-arms, which are shortened and rounded, so as to permit the arms to turn freely up or down in the jaw-openings. Suitable holes are made through the jaws and rake-arms for the insertion of pins, by means of which the rake-arms may be fixed in a horizontal position or at any desired angle of inclination. Underneath each rake-arm is a light tooth-bar, $n$, extending from the jaws to the outer end of the rake-arms. These bars $n$ are swung on pivots $p'$ to the rake-arms at three points—one at the center and one at each end. These bars $n$ are swung so far from the under side of the rake-arms as to permit the bars to be moved outward from the stacking-shaft B. The rake-teeth $t$ are pivoted on the front of the rake-arms, and each passes loosely through a staple, $s$, on the tooth-bar $n$, the lower ends of the teeth being curved or bent backward from the face of the arm to which they are attached, and, if deemed necessary, this curvature may be three-fourths of the entire length of the teeth.

Near the inner end of each tooth-bar, and a little above the middle horizontal line thereof, is pivoted the lower end of the teeth-guide handle O, which extends upward and above the rake-arm, so that by moving it toward the shaft B the bars $n$ will be moved outward, thus moving the teeth $t$ and placing them at any desired angle with the shaft B. As the rake-head is revolved the handle O comes in contact with the pivoted arm $r$, secured to the stacking-shaft, causing said arm to be pushed backward, and thus inclining the teeth $t$, which action tends to slope the stack. This movement can be continued until the bars $n$ impinge on the lower edges of the rake-arms, the handle being held in position by the spring-dog P. By the combined movement of the rake-arms and bars $n$, as described, the arms and teeth can be so adjusted as to form any desired slope for the stack. The teeth may be made of any desired shape and length. They will, however, be of half-inch round iron or steel, about thirty inches long, and bent or curved, as before stated.

Fitting loosely on a pin or tenon, $c$, made of or upon the top of the stacking-shaft B, is the guy-rope collar C, having four equidistant ring-staples, Q, fixed on the outside of the collar. Each one of these staples has permanently secured thereto a guy-rope, I. The guy-poles H have each a slot in the top to receive said guy-ropes. The poles are set equidistant from each other, their lower ends on the arc of a circle whose radius from the center of the stack is greater than that of the stack itself, the tops of the poles being in a still greater radius than the bottoms. The guy-ropes, after having passed through the slots in the top of the poles, are hauled taut and fastened to ring-stakes $s'$. Thus the ropes hold securely in place the guy-poles and stacking-shaft. When the machine is thus adjusted and the rake-head is upon the rest $a$, with the rake-arms secured in a horizontal position, the power is applied at the outer end of shaft $d$, which is turned in such direction that by the gearing $k\ e$ the stacking-shaft will turn in the toe-rest and carry around with it the rake-arms D, the lower ends of the teeth being under and following the arms and bars $n$.

If the screw-shaft B', Fig. 4, with the foot $x$ and the square nut-plate $z$, be used, it is obvious that the turning of socket $m$ must carry around the nut-plate $z$, fitted in it, and with it the shaft B'. This foot $x$ has a shoulder at the top of it, so as to prevent the jamming of the nut-plate upon the foot. The plate $z$ fits loosely in the socket $m'$, so as to allow a sway of the top of shaft B'. The two sides of nut $v$ are set so tightly to the screw-thread on the stacking-shaft by the set-screws $w\ w'$ that the shaft when turned will carry around with it the rake-head and rakes, but so that in case any obstruction is made by accumulation of straw the turning of the stacking-shaft in the rake-head will raise it upon the screw-threads above such obstruction, and the rake-head and rakes will turn with the stacking-shaft as before. The material to be stacked is delivered near the stacking-shaft B, and as the rakes move around, the teeth force and distribute the material from the shaft and toward the outward end of the rakes, and the weight of the rake-head and rakes and the spring of the teeth press such material firmly into its proper place in the stack. By regulating the direction of the teeth, or by leaving the rake-arms loose to adjust themselves, the slope of the stack is kept up until it is topped out. When the stack is topped out the guy-ropes are loosened, the poles taken down, the collar $a$ taken off, the rakes detached from the rake-head and taken to the ground, the rake-head raised over the top of the stacking-shaft and also let down to the ground, the stacking-shaft raised out of the socket $m$ and up through the stack. A team is then hitched to a fastening, $A^2$, attached to the gear-box, and the box drawn from under the stack. To make this operation easy the gear-box is wedge-shaped or slightly decreased in thickness and width from the outer end to the inner end of the box, as shown in Fig. 2. When a platform of rails or boards is used for the stack to rest upon, a suitable opening in said platform may be provided for the withdrawal of the gear-box.

What I claim is—

1. In a stacking-machine, the combination, with a gear-box provided with suitable gear, of a stacking-shaft actuated by said gear, substantially as and for the purpose set forth.

2. In a stacking-machine, the combination of the stacking-shaft, a rake-head vertically adjustable on the shaft and having four openings equidistant from each other, and rake-arms adjustably secured to the rake-head, substantially as and for the purpose set forth.

3. In a stacking-machine, the combination of a shaft, B, a rake-head, the rake-arms adjustably secured to said head and provided with teeth, and an adjustable bar provided with teeth-guides, substantially as and for the purpose set forth.

4. In a stacking-machine, the combination, with actuating mechanism for operating the vertical stacking-shaft B, of the inclined or wedge-shaped box A, inclosing said mechanism, and provided with a hook, $A^2$, for withdrawing the box from under the stack when completed, substantially as set forth.

5. In a stacking-machine, the combination, with the stacking-shaft B and socket $m$, of the shaft $j$, toe-rest $f$, and bevel-gear $k\ e$, substantially as set forth.

In testimony that I claim the foregoing as my own I have hereto affixed my signature in presence of two witnesses.

NATHAN NEWSOM.

Witnesses:
 OLIVER M. SIMMONS,
 JACOB W. LOEPER.